United States Patent [19]

MacFarlane

[11] Patent Number: 4,915,000
[45] Date of Patent: Apr. 10, 1990

[54] CUTTING MACHINE

[76] Inventor: Richard O. MacFarlane, 4 Ladner Street, O'Connor, Western Australia, Australia, 6163

[21] Appl. No.: 197,988

[22] Filed: May 24, 1988

[30] Foreign Application Priority Data

May 25, 1987 [AU] Australia .............................. PI02099

[51] Int. Cl.$^4$ ........................ B26D 1/46; B27B 13/00; B23D 55/08
[52] U.S. Cl. .................................... 83/651.1; 83/661; 83/820; 125/21
[58] Field of Search ...................... 83/651.1, 820, 661; 125/21

[56] References Cited

U.S. PATENT DOCUMENTS 3,350,970 11/1967 Glastra .................................. 83/820

FOREIGN PATENT DOCUMENTS 420029 4/1970 Australia .
409732 5/1970 Australia .
1307460 2/1973 United Kingdom .
1400524 7/1975 United Kingdom .
1515516 7/1975 United Kingdom .

Primary Examiner—Donald R. Schran
Attorney, Agent, or Firm—Kinney & Lange

[57] ABSTRACT

A machine for cutting foam material having an endless cutting wire (80) supported on a number of rollers (51, 52, 53, 54 and 55) to travel a fixed length continuous path. Two of the rollers (52, 53) being mounted to move along respective parallel paths in synchronism to displace that portion (81) of the wire (80) extending between the rollers (52, 53) in the plane of rotation of those rollers. A motor (42) to drive the endless wire (80) about the continuous path so the foam material presented to the portion (81) of the wire may be cut thereby. The displacement of the roller (52, 53) being controlled by a motor (69) under the control of an ECU (40) to determine the shape to which the foam material is cut.

8 Claims, 4 Drawing Sheets

4,915,000

CUTTING MACHINE

BACKGROUND OF THE INVENTION

1. Field of the Invention

This invention relates to the cutting of materials using an endless cutting wire moving along a continuous path. This form of cutting is known and has previously been used in the cutting of two-dimensional shapes by moving the cutting wire in one plane with respect to the material being cut, and moving the material with respect to the cutting wire in a plane at right angles to the plane of movement of the wire

2. Description of the Prior Art

In known machines for cutting material in this manner, it is usual for the cutting wire to be in the form of an endless band supported on four rollers arranged in a rectangular formation with the cutting wire forming one side of the rectangular, acting as the cutting edge. In such known constructions the complete structure carrying the four rollers supporting the wire in the rectangular form must be mounted for movement, usually in a vertical plane. Having regard to the weight and physical size of the structure problems arise in maintaining the required accuracy in the movement of the cutting edge portion of the wire. This construction exhibits particular problems in attempts to control the movement of the cutting edge by a computer programme. These problems generally relate to the inertia effects arising in the movement of the structure supporting the cutting wire, and the table supporting the material to be cut, which is also moved in order to cut two dimensional shapes.

SUMMARY OF THE INVENTION

Accordingly, it is the object of the present invention to provide an improved system for cutting materials using an endless wire which will result in a simpler construction of the relevant machine and more accurate operation thereof.

With this object in view, there is provided in a cutting machine an endless wire supported by a multiple of rollers to travel a fixed length continuous path with a portion of the wire that extends between two of the said rollers providing a cutting element as the wire travels the continuous path, drive means operable to cause the wire to travel the continuous path, said two rollers being arranged to rotate in a common plane when the wire is travelling the continuous path and being displacable in synchronism to move the path of the cutting element in said plane whilst maintaining the length of the continuous path substantially constant.

Conveniently, the assembly of rollers and the endless wire are supported for movement as a unitary structure in a direction normal to the plane in which the cutting element of the wire is displacable. In this manner the cutting element may perform a cutting operation to produce a two dimensional shape by the combined action of moving the cutting element of the wire in two directions at right angles.

It is to be understood that the unitary structure carrying the rollers and endless cutting wire may be moved relative to the material being cut in the direction at right angles to the plane of movement of the cutting element portion of the wire, or conversely the material being cut may be moved in that direction, relative to the structure supporting the rollers and cutting wire.

In one embodiment the rollers may be arranged so as to provide two portions of the wire as cutting elements arranged at right angles, each extending between respective pairs of rollers, and each pair of rollers being independently movable in the plane of their rotation so that each cutting element of the wire may be moved independently in that plane. In this way it is possible to then cut three-dimensional forms.

The ability to raise and lower the cutting element by only moving two of the series of rollers supporting the wire, enables the general structure carrying the wire and its multiple rollers to be of a relatively light construction and hence, subject to reduced inertia load when moving. The accuracy and speed of movement of the two rollers which effect the raising and lowering of the cutting portion can be effected more accurately, and at greater speed than was possible in previous constructions, wherein the whole assembly of pulleys was required to move.

The invention will be more readily understood from the following description of practical arrangements of the cutting machine, incorporating the present invention as illustrated in the accompanying drawings.

DETAILED DESCRIPTION OF THE PREFERRED EMBODIMENTS

Figure 1:
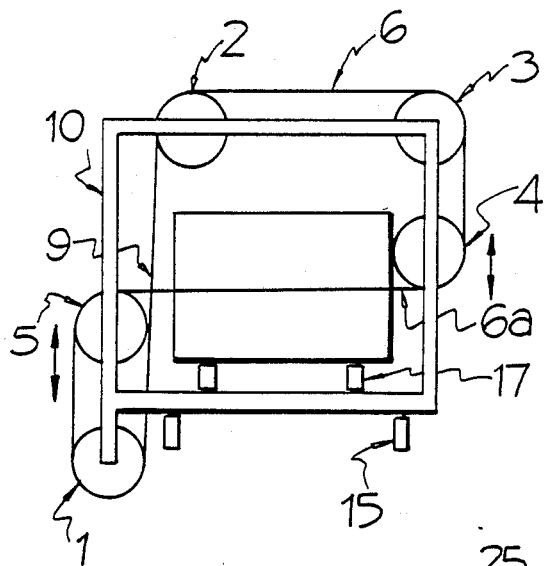
FIG. 1 is a schematic representation of one arrangement of the pulleys supporting the cutting wire incorporating a single cutting element.

A typical arrangement of the series of pulleys and the endless cutting wire is shown in FIG. 1 of the drawings, wherein the pulleys 1, 2 and 3 are mounted for rotation on fixed axes by spindles secured to the rigid frame 10. The pulleys 4 and 5 are each mounted on spindles for rotation and the spindles are supported for sliding movement in the vertical direction, as seen in FIG. 1, on the frame 10. The configuration of the cutting wire 6 around the pulleys can be clearly seen, and the pulleys 1 and 2 are in a plane slightly offset from the plane of pulleys 4 and 5 so that the cutting wire 6 may cross at the point 9 without interference. The slidable spindles supporting the pulleys 4 and 5 are interconnected so as to move together up or down, at the same rate and in the same direction, with respect to the frame 10.

As a result of this movement of the pulleys 5 and 6, the portion 6a of the wire 6 extending therebetween remains straight and at right angles to the direction of up and down movement of the pulleys. The length of the path of travel of the cutting wire 6 will also remain constant, and so the cutting wire will be retained taut, and in contact with all of the pulleys, as the portion 6a of the cutting wire is moved up or down in the vertical plane.

Conveniently the slidable spindles supporting the pulleys 4 and 5 are interconnected by an endless chain driven by an electric motor, whereby when the motor is driven in one direction, the pulley 4 and pulley 5 move upwardly and when the motor is reversed the pulley 4 and 5 move downward. A suitable electric motor and speed reduction gearbox is provided to drive the roller 1 to cause the wire 6 to travel about its continuous path so that the cutting portion 6a may perform a cutting action.

Figure 2:
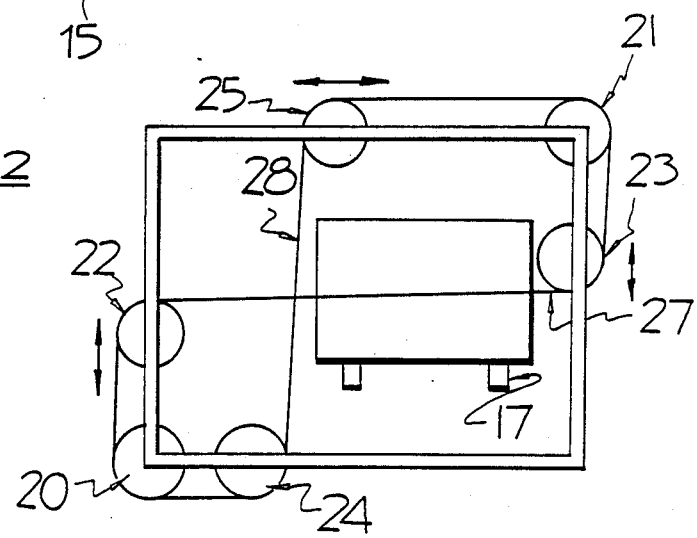
FIG. 2 is a schematic representation of an alternative arrangement of the pulleys supporting the cutting wire incorporating two cutting elements.

FIG. 2 of the drawings shows an alternative arrangement of pulleys in which pulleys 20 and 21 rotate on fixed axes, whilst pulleys 22 and 23 rotate on axes which may be moved up and down in the direction as indicated, whilst pulleys 24 and 25 may be moved horizontally in either direction as indicated. In this configuration there are two portions of the wire 6 constituting cutting elements, 27 and 28. These cutting elements may be moved independently with respect to the material being cut, and with that material being moved in a direction normal to the two cutting elements 27 and 28 of the wire, that is in a direction normal to the page, a three-dimensional configuration can be generated.

Figure 3:
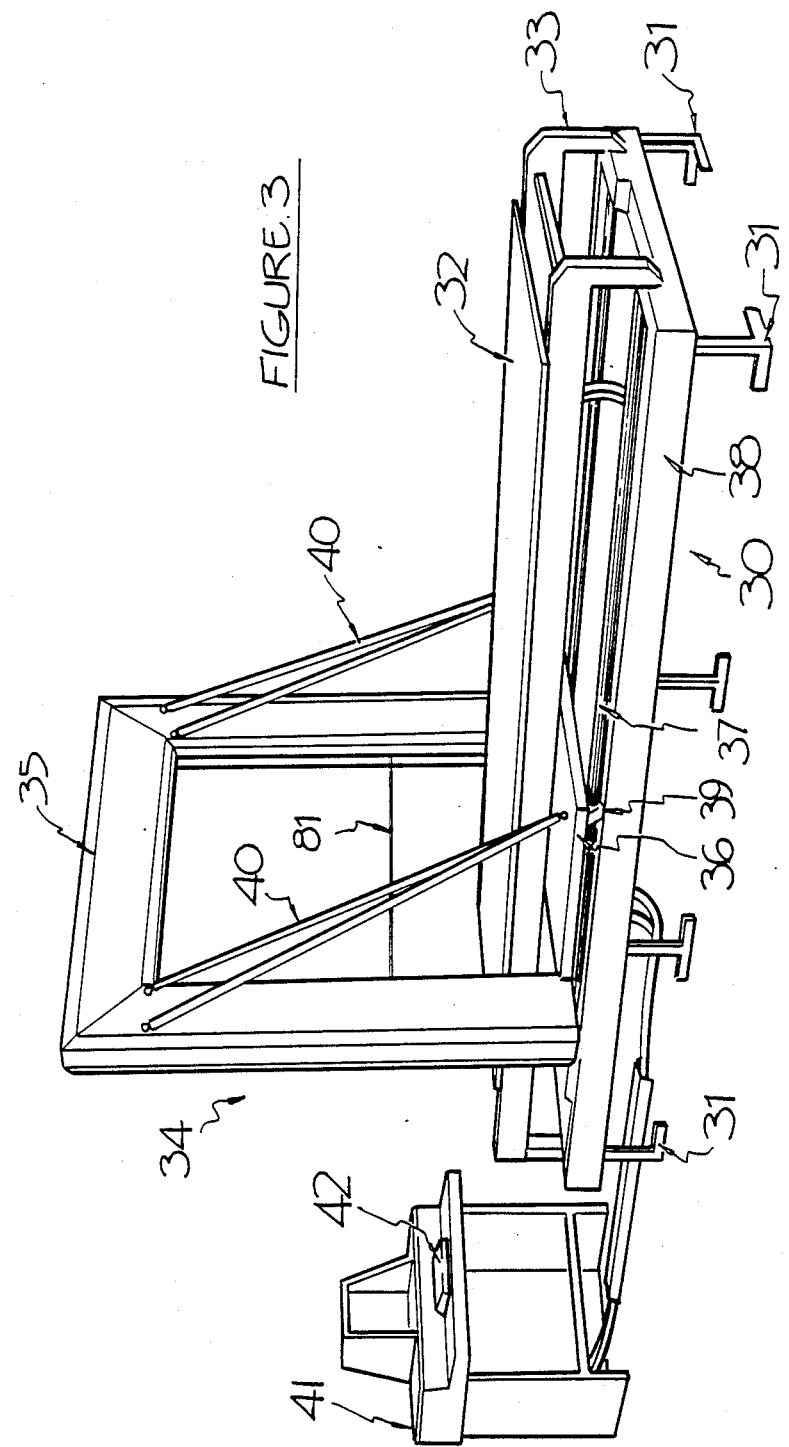
FIG. 3 is a perspective view of a general arrangement of the cutting machine.

The general layout of a typical cutting machine is shown in FIG. 3, comprising a base frame 30 to be supported by the plurality of legs 31 which may be conveniently anchored to a floor. Rigidly mounted on the base frame 30 is a platform 32 upon which the material to be cut is to be supported. The platform 32 is only connected to the base frame 30 at the respective ends of the base frame 30 by the uprights 33.

The cutter frame 34 includes a vertically disposed wire carrier frame 35 of a generally inverted "U" shape configuration and a generally horizontal slide frame 36.

The slide frame 36 is mounted on a pair of rails 37, one on each of the longitudinal members 38 of the base frame 30. The slide frame 36 extends beneath the platform 32 and has linear bearings 39 which embrace the respective rails 37 so that the slide frame 36 is secured to the rails, but is free to slide therealong in the longitudinal direction of the base frame 30. The carrier frame 35 is rigidly attached to the slide frame 36 to move in unison therewith and the stay bars 40 stablise the carrier frame 35 with respect to the sliding frame 36 so that the carrier frame is maintained in a vertical disposition at all times, including during movement thereof in the longitudinal direction with respect to the base frame 30.

The console 41 incorporates a programmable electronic control unit (ECU) and a keyboard 42, by which input can be made to the ECU. The ECU functions to control the shape to be cut by the travelling endless cutting wire 80, by controlling the height of the cutting element 81 of the wire above the surface of the platform 32, and the longitudinal disposition of the cutting element with respect to the platform 32. This control is achieved by reversible electric motors 69 and 85 that affect the raising and lowering of the cutting element and the longitudinal movement of the cutter frame 34, as will be described hereinafter.

Figure 4:
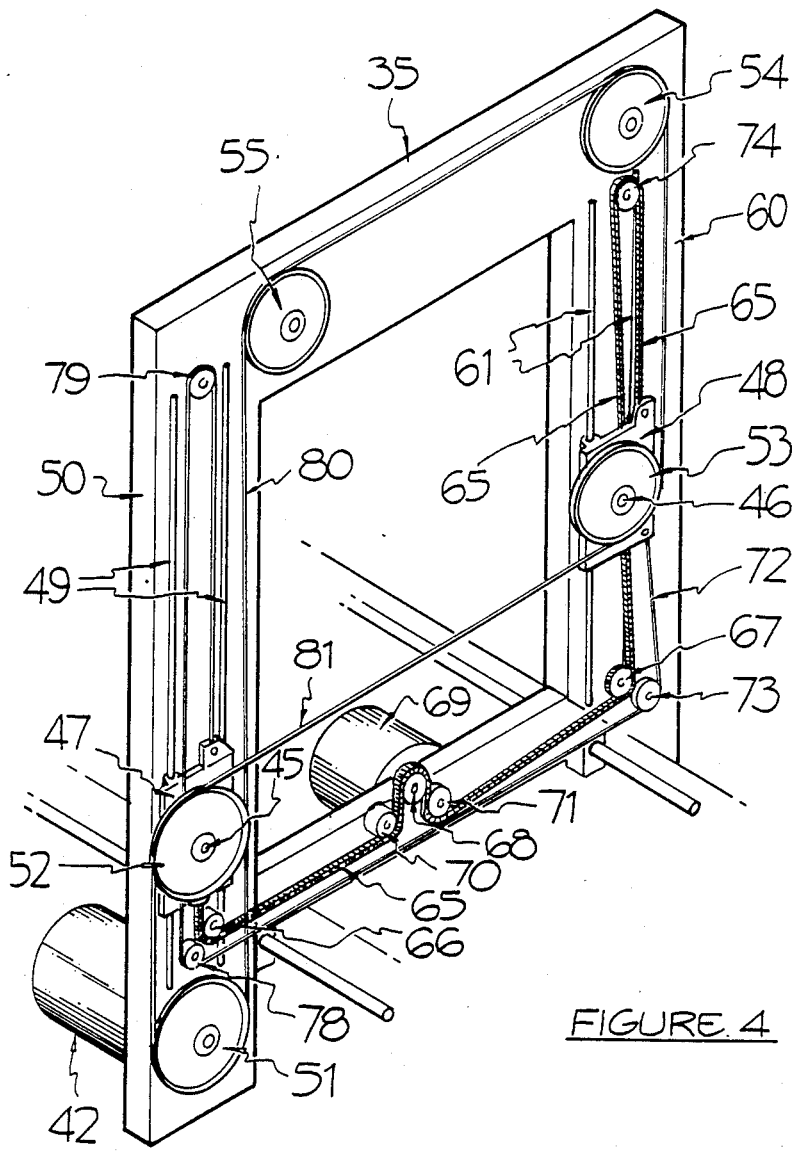
FIG. 4 is a perspective view of the travelling frame that carries the cutting wire.

As seen in FIG. 4 of the drawings, the vertically disposed carrier frame 35 has supported thereon a series of five pulley wheels numbered 51, 52, 53, 54 and 55. The pulley 51 is mounted on the drive shaft of the electric motor 42, which is mounted on the carrier frame 35. The pulleys 54 and 55 are mounted on respective spindles attached in fixed positions on the carrier frame 35 in the upper portion thereof. The pulleys 52 and 53 are rotatably mounted on respective spindles 45 and 46 secured to mounting plates 47 and 48, which are mounted on the carrier frame 35 for sliding movement relative thereto in the vertical direction. The mounting plate 47 is slidably supported on the pair of rails 49, fixedly attached to upright portion 50 of the carrier frame 35. The connection between the mounting plate 47 and the rails 49 is in the form of linear bearings to provide stability to the mounting plate as it moves along the rails 49.

A similar form of mounting plate and rail construction is incorporated in the opposite vertical portion 60 of the carrier frame, as indicated by the rails 61 and mounting plate 48.

A length of drive chain 65 has one end anchored to the mounting plate 47 to extend downwardly therefrom around the guide roller 66, and then horizontally across the carrier frame 35 to a corresponding roller 67 on the opposite vertical portion 60 of the carrier frame. Between the guide rollers 66 and 67, the chain 65 engages a drive sprocket 68 mounted on the shaft of the electric motor 69. The motor 69 and the further guide rollers 70 and 71 are mounted on the carrier frame 35 to move in unison therewith, as the complete cutter frame 34 moves with respect to the base frame 30 and platform 32. From the guide roller 67, the chain 65 passes up the vertical portion 60 of the carrier frame 35 to the guide roller 74 located adjacent the pulley 54. From the guide roller 74, the chain extends downwardly to be attached to the mounting plate 48 which carries the pulley 53. The chain 65 ends at the location where it is attached to the mounting plate 48.

Extending downwardly from the mounting plate 48 is a wire cable 72 which passes around the guide pulley 73 to extend across the carrier frame below the level of the chain 65 to the guide pulley 78 at the lower end of the vertical portion 50 of the carrier frame. From the pulley 78 the wire cable passes upwardly past the mounting plate 47 and around the guide pulley 79 adjacent the upper end of the vertical portion 50 of the carrier frame and from the pulley 79 downwardly to be attached to the mounting plate 47.

The above described configuration of the chain 65 and the cable 72 constitutes an endless flexible drive member which couples each of the mounting plates 47 and 48 to the motor 69 so that rotation of the motor 69 in the clockwise direction as viewed in FIG. 4, the mounting plates 47 and 48 will move in unison downwardly along their respective rails 49 and 61 and by rotation of the motor 69 in the anti-clockwise direction, the mounting plates 47 and 48 are moved in unison upwardly along their respective rails 49 and 60.

An endless cutting wire 80, of a known construction, is supported on the pulleys 51, 52, 53, 54 and 55 in a configuration as previously described with reference to FIG. 1 of the drawings. The cutting element portion 81 of the cutting wire 80, which extends between the pulleys 52 and 53, is disposed horizontal and parallel to the surface of the platform 32. As the pulleys 52 and 53 are raised or lowered with respect in the carrier frame 35 as previously described, the cutting element 81 of the cutting wire will always remain horizontal but the height thereof above the surface of the platform 32 will vary. Also as previously described with reference to FIG. 1, the length of the continuous path of the cutting wire 80 remains constant, irrespective of the movement and position of the pulleys 52 and 53, and thus the cutting wire will always remain taut so as to be driven by the motor 42 and to effect a cutting action by the cutting element 81.

Figure 5:
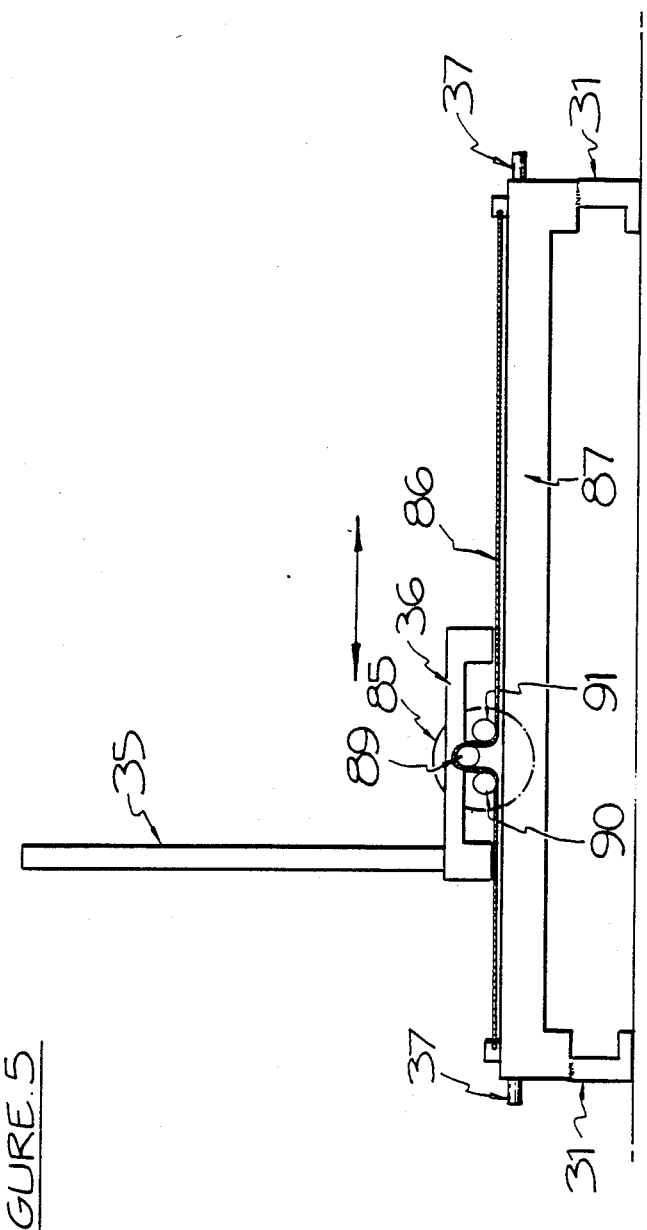
FIG. 5 is a fragmentary longitudinal view of the drive mechanism to move the cutter frame along the base frame.

As shown diagrammatically in FIG. 5, the electric motor 85 mounted on the sliding frame 36 engages with the chain 86 which is anchored at its respective ends to the bar 87 forming part of the base frame 30. The chain 86 engages the sprocket 89 on the shaft of the motor 85 and is guided on to the sprocket by the guide rollers 90 and 91. As the motor 85 is mounted on the slide frame 36 and the chain 86 is anchored to the base frame 30, operation of the motor 85 will cause the slide frame 36, and hence the cutting frame 34 in total, to move along the rails 37 to effect longitudinal displacement of the cutter frame in either direction with respect to the platform 32.

It will therefore be seen that by controlling the operation of the motors 69 and 85, it is possible to control the position of the cutting element 81 of the wire 80, both vertically and longitudinally with respect to the platform 32. Accordingly, any material located on the platform 32, and presented to the horizontal cutting element 81 will be cut to a two-dimensional contour as determined by the vertical and longitudinal movements of the cutting wire, with respect to the platform 32. It will further be seen that by controlling the operation of the motors 69 and 85 by the ECU, any appropriate two-dimensional shape can be cut in accordance with the programming of the ECU.

The machine as above described is specifically designed to cut polymeric foam materials. However, the machine may be used to cut other materials of a nature that may be cut by a moving wire. The known type of wire intended to be used in the machine described above is constructed of a core strand or strands with a strand wound hexilly about the core. This form of cutting wire is is known in the field of cutting polymeric foam materials as acknowledged hereinbefore.

Typical examples of prior art cutting machines using a moving wire as the cutter are disclosed in British Patents Nos. 1400524 and 1307460, and Australian Patent No. 409732.

The machine described herein with reference to FIGS. 2 to 5 of the drawings, has the cutting element of the wire disposed horizontally, and displacable vertically, however, other dispositions of the wire and movements thereof are included in the scope of the invention. Also as described with reference to FIG. 2, the cutting wire may have two portions thereof operable as cutting elements. In such a construction the pulleys at the ends of the second cutting elements are slidably mounted as described in respect of pulleys 52 and 53 and displaced by a motor and chain arrangement as the motor 69 and chain 65.

I claim:

1. A cutting machine having an endless wire supported by a plurality of rollers to travel a fixed length continuous path, drive means operable to cause the wire to travel the continuous path, a first portion of the wire that extends between a first pair of the rollers providing a first cutting element as the wire travels the continuous path, the first pair of rollers being arranged to rotate in a first common plane when the wire is traveling the continuous path and being displaceable in synchronism to move the path of the first cutting element in the first plane whilst maintaining the length of the continuous path substantially constant, a second pair of rollers arranged to rotate in a second plane with a portion of the endless wire extending between the second pair of rollers providing a second cutting element as the endless wire travels the continuous path, the second cutting element being inclined to the direction of the first cutting element, and the second pair of rollers being displaceable in synchronism to move the second cutting element in the second common plane, while maintaining the length of the continuous path substantially constant.

2. A cutting machine as claimed in claim 1, wherein the rollers supporting the wire are mounted on a cutter frame and arranged so the first common and second common planes in which said rollers rotate, are substantially vertical.

3. A cutting machine as claimed in claim 2, wherein said cutter frame is supported on a base frame for movement relative thereto in a substantially horizontal direction at right angles to said first and second vertical common planes.

4. A cutting machine as claimed in claim 3, wherein a stationary horizontal platform is mounted on the base frame to the support the material to be cut.

5. A cutting machine as claimed in claim 3, wherein a first motor is provided to effect the movement of said first pair of rollers in the vertical plane, and a second motor is provided to effect said movement of the cutter frame in said horizontal direction, and a programmable controller is provided to control the operation of said motors in accordance with the predetermined shape to be cut.

6. A cutting machine as claimed in claim 1, wherein said first pair of rollers are supported to move in synchronism along respective parallel tracks at right angles to the direction of the length of the cutting element.

7. A cutting machine for cutting multi-dimensioned shapes from a polymeric foam block, the cutting machine comprising:
   a stationary horizontal base to support the foam block in a fixed horizontal disposition;
   a cutter frame mounted on said base for controlled movement relative thereto in the longitudinal direction of the base in either direction;
   an endless cutter wire supported by a plurality of rollers mounted on said cutter frame so said cutter wire travels a fixed length continuous path with a portion of the cutter wire extending between two of the rollers providing a horizontal cutting element above the base as the cutter wire travels said continuous path;
   drive means operable to cause the cutter wire to travel the continuous path;
   said two rollers being arranged to rotate in a common vertical plane when the wire is travelling the continuous path and being displaceable in synchronism to move the path of the cutting element in said vertical plane whilst maintaining the length of the continuous path substantially constant;
   a first motor to effect the synchronous movement of said two rollers in the vertical plane;
   a second motor to effect said movement of the cutter frame in said longitudinal direction; and
   a programmable controller to control the operation of said first and second motors in accordance with the predetermined shape to be cut.

8. A cutting machine as claimed in claim 7, wherein said two rollers constitute a first pair of rollers, and a second pair of rollers are arranged to rotate in a second vertical plane so that a further cutting element extends in a direction inclined to the direction of the first cutting element, said second pair of rollers being displaceable in synchronism to move said further cutting element in said second plate, while maintaining the length of the continuous path substantially constant.

* * * * *

UNITED STATES PATENT AND TRADEMARK OFFICE
CERTIFICATE OF CORRECTION

PATENT NO. : 4,915,000

DATED : April 10, 1990

INVENTOR(S) : Richard O. MacFarlane

It is certified that error appears in the above-identified patent and that said Letters Patent is hereby corrected as shown below:

Column 6, line 66, delete "plate" insert --plane--.

Signed and Sealed this

Thirtieth Day of July, 1991

*Attest:*

HARRY F. MANBECK, JR.

*Attesting Officer*     Commissioner of Patents and Trademarks